Oct. 13, 1970   L. H. LIN   3,533,676
HYPERSTEREOSCOPIC AND HYPOSTEREOSCOPIC IMAGE GENERATION
Filed April 24, 1968   3 Sheets-Sheet 1

INVENTOR
L. H. LIN
BY
Roderick B. Anderson
ATTORNEY

Oct. 13, 1970
L. H. LIN
3,533,676
HYPERSTEREOSCOPIC AND HYPOSTEREOSCOPIC IMAGE GENERATION
Filed April 24, 1968
3 Sheets-Sheet 3
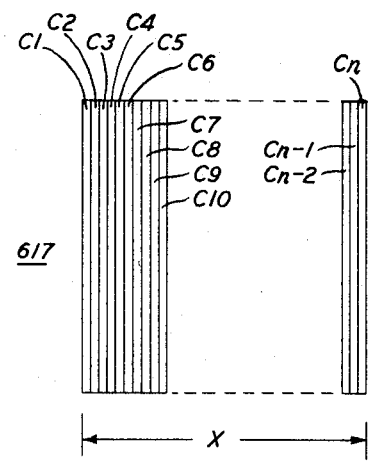
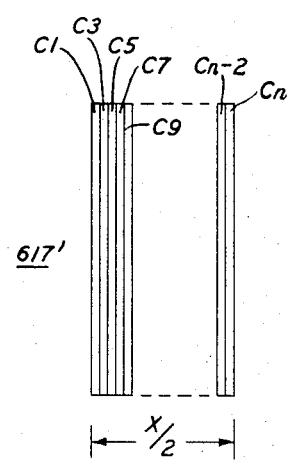
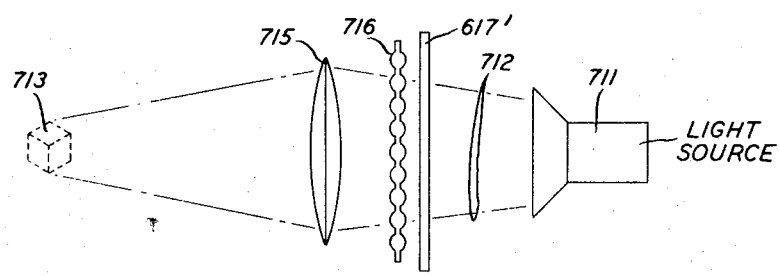
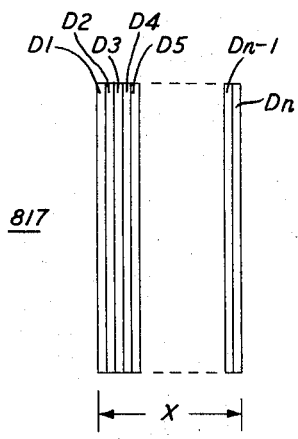
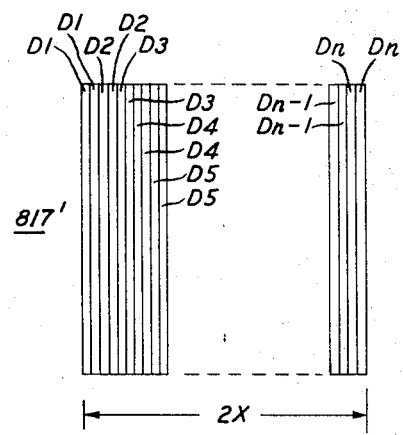

3,533,676
**HYPERSTEREOSCOPIC AND HYPOSTEREO-
SCOPIC IMAGE GENERATION**
Lawrence H. Lin, Chatham, N.J., assignor to Bell Telephone Laboratories, Incorporated, Murray Hill and Berkeley Heights, N.J., a corporation of New York
Filed Apr. 24, 1968, Ser. No. 723,785
Int. Cl. G02b 27/22
U.S. Cl. 350—3.5
8 Claims

ABSTRACT OF THE DISCLOSURE

Hyperstereoscopic and hypostereoscopic images are generated by the methods of holography or integral photography. For example, to form a hyperstereoscopic image, the Fourier transform of an illuminated object is formed and a hologram is made of the transform. The hologram is then divided into an array of vertical strips, and a certain percentage of these strips is discarded. The remaining strips are then arranged in the same order but next to one another and are illuminated to reconstruct a hyperstereoscopic image of the original object.

To form a hypostereoscopic image, the procedure is similar, but in this case the vertical strips are duplicated and a hologram formed in which identical vertical strips are next to one another and the same order of strips is preserved. When this hologram is illuminated, a hypostereoscopic image is observed.

BACKGROUND OF THE INVENTION

In viewing any object that is relatively nearby, each eye of the viewers records a slightly different image because each eye sees the object from a slightly different angle of view. For example, if the object viewed is forty centimeters from the viewer and if the distance between the eyes is six centimeters, the angular difference is almost nine degrees. The two different images that are recorded are fused in the brain so that the viewer is aware of only one image. However, this image has depth because of the angular difference between the eyes of the viewer.

If two photographs are made of an object at two points of view separated by a distance equal to that between the eyes of a viewer, each photograph records one of the slightly different images that would otherwise be recorded by the eye of a viewer. If these photographs are then viewed in such a way that each eye of the viewer sees and records only the image it would see if it were viewing the object directly, then the conditions of direct viewing are duplicated. And the two different images that are recorded by the eyes are fused in the brain so that the viewer is aware of only one image that has depth. Such a pair of photographs of two perspectives of an object is called a stereogram; and the techniques of forming and viewing such photographs is the subject of stereoscopy.

In viewing an object that is relatively far away, each eye of the viewer records substantially the same image because each eye sees the object from substantially the same angle of view. For example, if the object viewed is forty meters from the viewer and if the distance between the eyes is six centimeters, the angular distance is less than six minutes of arc. As a result, when the two images are fused in the brain, the resultant image has for most people little depth.

Devices have been invented for increasing the angle subtended by the eyes at a distant object so that each eye can record a different image. For example, stereoscopic range finders use a series of reflectors or prisms to gather light at two locations perhaps six meters apart and direct this light to the two eyes of the viewer. The device looks and operates somewhat like two periscopes, each extending in a lateral direction from an eye of the viewer.

Stereograms can be formed of the object viewed through the range finder simply by making separate photographs of what would otherwise be seen through the range finder by each eye of the viewer. When these photographs are illuminated and viewed with typical stereo-viewing equipment, the two images recorded by the eyes of the viewer are, of course, those that would be seen at the extremities of the range finder. Hence, the angle between the views is larger than it would be if the distant object were viewed directly, and the depth in the fused image is greater. Such an image will be referred to below as a hyperstereoscopic image.

In viewing an object that is very colse by, each eye of the viewer records a substantially different image because each eye sees the object from a substantially different angle of view. For example, if the object viewed is four centimeters from the viewer and if the interocular distance is six centimeters, the angular difference is a little more than ninety-seven degrees. These two images are very different and ordinarily cannot be fused in the brain. Experiments reported in the copending application of M. C. King entitled "Method for Recording Holograms or Integral Photographs with a Wide Angle View," Ser. No. 713,650, filed Mar. 13, 1968, and assigned to Bell Telephone Laboratories, Incorporated, indicate that the maximum angular separation between images that can be fused is approximately 38° for most people.

From what has been said above about a technique for increasing the angle subtended by the eyes of a viewer at a distant object, a method for decreasing the angle subtended by the eyes at a very close object should be evident. It is only necessary to use an appropriate optical system to gather light at two locations less than six centimeters apart and direct this light to the eyes of the viewer. As with the stereoscopic range finder, stereograms can be formed of the object so viewed and the stereograms in turn can be observed with typical stereo-viewing equipment. Once again, the two images recorded by the eyes of the viewer are those that would be seen at the entrance apertures of the viewing device; but because these apertures are closer together than the eyes of the viewer, the angle between the views is smaller than it would be if the nearby object were viewed directly. Moreover, if the angular separation between the views is less than approximately thirty-eight degrees, then the two images recorded by the eyes of the ordinary viewer can be fused. Such an image will be referred to below as a hypostereoscopic image.

From this description, however, it should be evident that the recording and viewing of hyperstereoscopic and hypostereoscopic images is very complicated, requiring elaborate optical equipment to form the stereograms and the usual stereo-viewing equipment to observe them.

SUMMARY AND THEORY OF THE INVENTION

Accordingly, it is an object of this invention to make more convenient the recording and viewing of hyperstereoscopic and hypostereoscopic images.

These and other objects of my invention are accomplished by the methods of holography or integral photography. In holography, when an object such as a three-dimensional figure is illuminated, it modulates the illuminating beam so as to form a beam of light that carries information represerative of the object. A recording, called a hologram, can be made of the phase and amplitude of this information-bearing beam by interfering on a recording medium, such as a photographic plate, the wavefronts of the information beam and a reference beam. When the record is properly illuminated, the information-bearing beam is reconstructed and an image of the stored object can therefore be seen.

Because the reconstructed information beam is the same as the original information beam, what is observed seems to have the properties of the original object. Thus, if the distance from the image to the viewer is forty centimeters, the image recorded by one eye of the viewer upon looking at the hologram is slightly different from the image recorded by the other eye, which is the case normally encountered in viewing a similarly situated object. And as a result, when the two images are fused, the fused image appears to have depth, just as the fused image obtained upon viewing an object directly or upon viewing a pair of stereograms appears to have depth.

However, unlike a pair of stereograms that records only two perspectives of an object, a hologram records all the views of an object over the solid angle that is subtended by the recording medium at the object during the recording process. Thus, although a viewer of a pair of stereograms sees the same two perspectives of the object even though he varies his position with respect to the stereograms within a certain range, the viewer of a hologram sees different views of the object as he varies his position with respect to the hologram and therefore with respect to the reconstructed information beam. However, at any one position, each eye records only one view of the object, just as each eye records only one view when the object is physically present and is directly observed.

These properties of the hologram are utilized in the present invention to form hyperstereoscopic and hypostereoscopic images. For example, to form a hyperstereoscopic image of an object, a special type of of hologram, called a Fourier transform hologram, is made by well-known procedures. The hologram is then divided into an array of vertical strips; and a certain percentage of these strips, for example, every other strip, is discarded. The remaining strips are then arranged in the same order but next to one another and are illuminated to reconstruct the hyperstereoscopic image of the original object.

As discussed more fully in my copending application entitled "Information Reduction by Fourier Transform Sampling," Ser. No. 712,838, filed Mar. 13, 1968, and assigned to Bell Telephone Laboratories, Incorporated, the location of an image reconstructed from a Fourier transform hologram does not change as the Fourier transform hologram is moved in the plane in which it is ordinarily illuminated. Hence, the location of an image reconstructed from a strip or a set of strips of a Fourier transform hologram does not move as the strip or strips are moved in the plane of the hologram. And as a result, when a viewer studies the image reconstructed from a hologram, the position of the image in space is unique even though each eye of the viewer sees the image by looking at a different hologram strip or even a different set of hologram strips. Of course, even though the image reconstructed from each hologram strip appears to be located in the same space, the image recorded by one eye of the viewer upon looking at the hologram is different from the image recorded by the other eye, just as each eye records a different view of the object when looking at an ordinary hologram.

The effect of discarding a certain percentage of the hologram strips and moving the remaining strips together is to decrease the distance between hologram strips that record different views of the object. As a result, upon looking at a hyperstereoscopic hologram, the viewer can see parts of the hologram, and therefore views of the reconstructed object, that ordinarily are too far apart to be viewed directly at one time. In other words, the angle between the two views that are observed is increased, just as the angle is increased when viewing a hyperstereoscopic image through a stereoscopic range finder.

A second effect of discarding some of the hologram strips, and a further object of my invention, is to reduce the amount of information required to be stored in a hologram in order to reconstruct a satisfactory image of the object. Obviously, the amount of information reduction achieved is related to the percentage of hologram strips discarded. This reduction in information stored can be used to advantage in several ways. For example, if the hologram information is transmitted by means such as facsimile, a reduction in the amount of information to be transmitted reduces either the time or the radio frequency bandwidth required to transmit it.

In analogous fashion, a hypostereoscopic image of an object is formed by first making a Fourier transform hologram of it and dividing the hologram into an array of vertical strips. At least one copy of some of the strips is then made. The sets of strips are then interleaved so as to form a second hologram in which identical vertical strips are next to one another and the same order of strips is preserved. When this hologram is illuminated, a hypostereoscopic image is observed.

The effect of interleaving the hologram strips is to increase the distance between hologram strips that record different views of the object, thereby enabling the viewer to see parts of the hypostereoscopic hologram, and therefore views of the object, that are ordinarily too close together to be viewed directly at one time. In other words, the angle between the two views that are observed is decreased, just as the angle is decreased when viewing a hypostereoscopic image through an appropriate device.

Alternatively, the objects of my invention are achieved by forming a Lippmann integral photograph of a light beam produced by illuminating the object to be recorded. In this instance, the object is located in the front focal plane of a large field lens, behind which is a rectilinear array of equally spaced spherical lenslets, sometimes called a fly's eye lens, and a recording medium in the image plane of the fly's eye lens. As with all integral photographs, the light used to illuminate the object need not be coherent, and no reference beam is used.

As a result of this arrangement, the field lens forms at least an approximation to the Fourier transform of the light beam from the object; and the fly's eye lens forms a rectilinear array of inverse Fourier transforms of the Fourier transform. As is well known, the inverse Fourier transform of the Fourier transform of a beam of light is the original beam of light; and consequently the fly's eye lens forms on the recording medium a rectilinear array of tiny images of the original object. Because the effect of forming a Fourier transform with the field lens is to render parallel the light diverging from a point in the front focal plane of the lens, each of the images formed by the fly's eye lens is directly behind one of the lenslets.

A hyperstereoscopic image of the object is then formed by dividing the rectilinear array of images into a multitude of vertical strips, each of which strips contains in its horizontal direction an integral number of tiny images. A certain percentage of these strips, for example every other strip, is then discarded. The remaining strips are then arranged in the same order but next to one another and are aligned with the lenslets of a similar fly's eye lens. When these strips are illuminated, the light that passes through the strips and then through the fly's eye lens and a field lens reconstructs a hyporstereoscopic image of the original object.

Analogously, a hypostereoscopic image is formed by dividing the array of images into a multitude of vertical strips and making copies of these strips. The sets of strips are then interleaved so as to form a second integral photograph in which identical vertical strips are next to one another and the same order of strips is preserved. These strips are then aligned with a suitable fly's eye lens, and when they are properly illuminated a hypostereoscopic image is observed.

BRIEF DESCRIPTION OF THE DRAWING

These and other objects and features of my invention will be more readily understood from the following detailed description taken in conjunction with the accompanying drawing in which:

FIGS. 6A and 6B are a schematic illustration of the changes made in the integral photograph of FIG. 5 in accordance with a third embodiment of my invention;

FIG. 7 is a schematic illustration of apparatus used to reconstruct a real image of the object stored in an integral photograph by the apparatus of FIG. 5; and FIGS. 8A and 8B are a schematic illustration of the changes made in the integral photograph of FIG. 5 in accordance with a fourth embodiment of my invention.

DETAILED DESCRIPTION OF THE DRAWING

Figure 1:
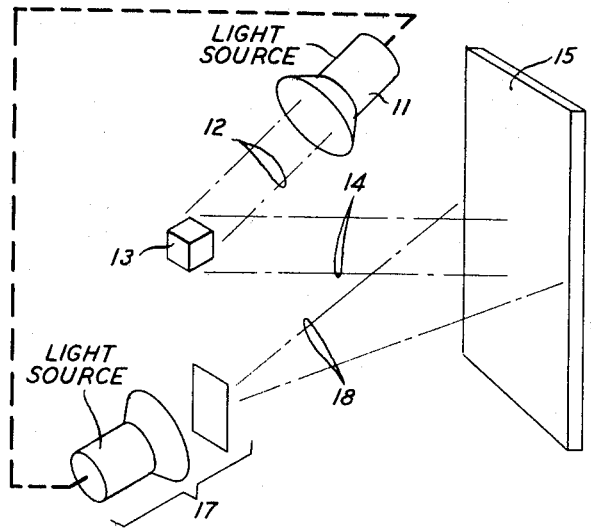
FIG. 1 is a schematic illustration of typical prior art apparatus used to form a Fourier transform hologram as the first step in certain embodiments of the present invention.

Referring now to FIG. 1, there is shown illustrative prior art apparatus used to form a lensless Fourier transform hologram. As its name suggests, this hologram is formed without a lens, thereby simplifying the apparatus and the recording process. The apparatus comprises a coherent light source 11 from which is projected an illuminating beam 12, a three-dimensional object 13 of which the hologram is to be made, a recording medium 15, typically a photographic plate, and a coherent light point source 17 from which is projected a spherical wavefront reference beam 18 that is phase-related to illuminating beam 12.

As explained more fully by G. W. Stroke in "Lensless Fourier Transform Method for Optical Holography," Applied Physics Letters, vol. 6, No. 10, page 201, (May 15, 1965), a spherical wavefront can be used to form a lensless Fourier transform hologram provided the illuminated object, the spherical wavefront source and the recording medium are arranged in a certain way. Specifically, point source 17 and the center of object 13 should be, and in my recording process are, equidistant from recording medium 15 and both the size of object 13 and the distance between object 13 and point source 17 should be, and are, small compared to the distance between object 13 and medium 15.

To ensure that reference beam 18 is phase related to illuminating beam 12, it is best to use a system of beam splitter and mirrors to derive reference beam 18 from illuminating beam 12. However, to avoid undue complication of FIG. 1, the common origin of the two beams is indicated by a dotted line between source 11 and source 17.

To form the Fourier transform hologram, illuminating beam 12 is directed from source 11 onto object 13 where it is modulated to form an information-bearing beam 14 that is reflected onto recording medium 15. At the same time, phase related spherical reference beam 18 is directed from source 17 onto photographic plate 15. Interference between beams 14 and 18 forms a set of interference fringes on medium 15; and a record is made of this set of fringes.

The necessary steps are then taken to preserve the record of the fringes formed on medium 15. If, for example, the recording medium is an ordinary photographic emulsion, the emulsion must be developed and fixed; but for other types of recording media, developing and fixing may not be required. In any event, the resultant record constitutes a hologram.

Figure 2A:
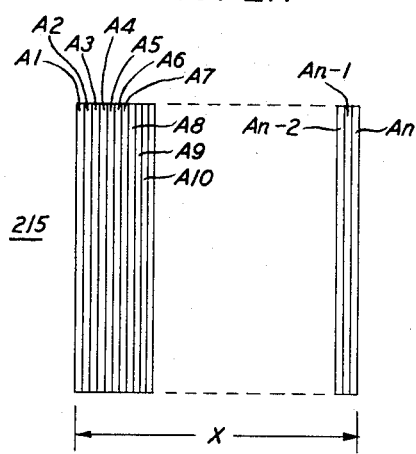
FIGS. 2A and 2B are a schematic illustration of the changes made in the Fourier transform hologram of FIG. 1 in accordance with a first embodiment of my invention.
Figure 2B:
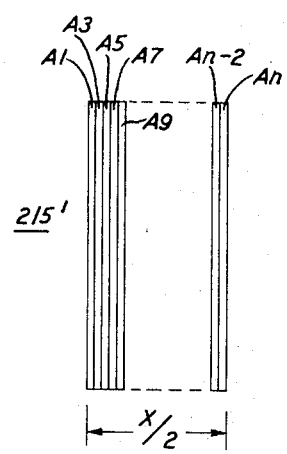

To form a hologram from which can be reconstructed a hyperstereoscopic image, I divide the first hologram, shown as element 215 in FIG. 2A, into a multitude of vertical strips, numbered A1, A2, A3, . . ., An–2, An–1, An. I then discard a certain percentage of these strips and move the remaining strips together to form a second hologram. Illustratively, I discard every other strip, namely strips A2, A4, A6, . . ., and move the remaining strips together to form a second hologram, shown as element 215' of FIG. 2B, that is comprised of strips A1, A3, A5 . . . . Note that the order of the undiscarded strips is the same as in FIG. 2A and that the distance between any pair of strips, as measured from the center of each strip, is fifty percent less than in FIG. 2A. Note also that the strips are moved together so that no empty spaces are left where strips were discarded. Were such spaces left, undesirable lines would be observed on the reconstructed image when the hologram is illuminated.

Figure 3:
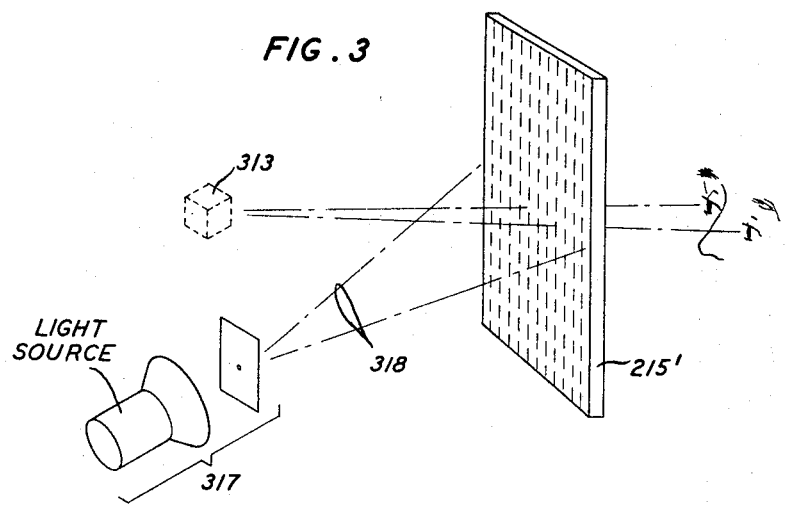
FIG. 3 is a schematic illustration of apparatus used to reconstruct a virtual image of the object stored in a hologram by the apparatus of FIG. 1.

The hyperstereoscopic image is viewed with typical illumination apparatus shown in FIG. 3. There hologram 215' is mounted so that it has the same position relative to point source 317 that recording medium 15 has to point source 17 when the interference fringes are formed. Consequently, a beam 318 from source 317 is similar in direction and the shape of its wavefronts to reference beam 18 of FIG. 1. Under such conditions, when hologram 215' is illuminated by beam 318, a viewer situated as indicated in FIG. 3, sees a virtual hyperstereoscopic image 313 of object 13 recorded in hologram 215'.

Figure 4A:
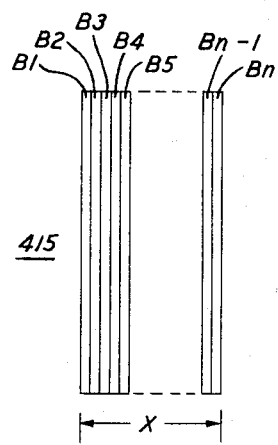
FIGS. 4A and 4B are a schematic illustration of the changes made in the Fourier transform hologram of FIG. 1 in accordance with a second embodiment of my invention.
Figure 4B:
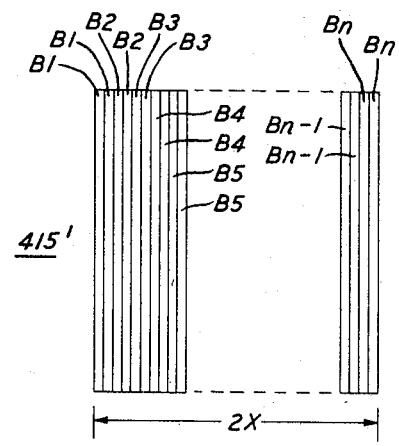

To form a hologram from which can be reconstructed a hyperstereoscopic image, a first hologram is formed as in FIG. 1; and the first hologram, shown as element 415 in FIG. 4A, is divided into a multitude of vertical strips, numbered B1, B2, B3, . . ., Bn–1, Bn. Each of these strips is then copied a certain number of times; and the sets of strips are then interleaved to form a second hologram in which identical vertical strips are next to one another and the same order of strips is preserved. Illustratively, a single copy of each strip is made; and the two sets of strips are interleaved to form a second hologram, shown as element 415' of FIG. 4B, comprised of strips B1, B1, B2, B2, . . ., Bn–1, Bn–1, Bn, Bn. Note that the order of the different strips is the same as in FIG. 4A and that the average distance between pairs of different strips, as measured from the center of each strip, is twice what it is in FIG. 4A.

The hypostereoscopic image is then viewed with typical illumination apparatus such as that shown in FIG. 3. In this case, hologram 415' is mounted so that it has the same position relative to the illuminating point source that hologram 215' of FIG. 3 has to point source 317 and recording medium 15 of FIG. 1 has to point source 17. Under such conditions, when hologram 415' is illuminated by a spherical illuminating beam from the point source, a viewer sees a virtual hypostereoscopic image of the object recorded in hologram 415'.

Whether a hyperstereoscopic or a hypostereoscopic image is desired, there are limitations on both the minimum and maximum width of the hologram strips. As one might expect, a decrease in the width of the hologram strip causes a decrease in the resolution of the reconstructed image. However, it can be shown that there is little loss of resolution if the width of each hologram strip is larger than $dA/(d+D)$, where $d$ is the distance of the reconstructed image of the object from the hologram, where $A$ is the aperture of the viewing system, for example, the diameter of the pupil of the eye or of the lens of a camera, and where $D$ is the distance of the viewing system from the hologram. Assuming that the diameter of the pupils of the viewer's eyes is three millimeters and that the viewer is twice as far from the hologram as the reconstructed image, the width of the hologram strip should be about one millimeter when it is viewed by a person.

Because each eye of the viewer must record a different view if the image is to have depth, the width of each hologram strip must be less than the interocular distance, which is approximately six centimeters. In actual practice, however, it is desirable that the width of each strip be considerably smaller than six centimeters; for if each hologram strip is relatively wide, the number of different views of the object will be few and it is likely that the transition from one view to another will not be smooth. Consequently, if the hologram is viewed by moving one's head from one side of the hologram to the other, the image appears to jump from one view to another. To avoid this unpleasant "jumpy" effect, it is best to use strips as narrow as the resolution limit permits.

The use of such narrow strips ordinarily creates the situation in which each eye of the viewer sees the reconstructed image behind a set of hologram strips instead of behind just one strip as is depicted for convenience in FIG. 3. Here too, however, I have found that the reconstruction and viewing of the image are not impaired as long as the transition between the views recorded on adjacent strips is small.

The maximum amount of information reduction that can be gained in forming a hyperstereoscopic image suitable for viewing by a person can be readily calculated from the arrangement of the object and the recording medium. As described in the aforementioned patent application of M. C. King the maximum angular separation between images that can be fused is approximately 38° for most people. Hence the distance, S, on a recording medium between the two areas or strips that record the information needed to reconstruct two images having the maximum angular separation is given by $$S = 2d \tan 19° \approx .7d$$

where $d$ is the distance of the object from the recording medium during the formation of the hologram. Because information reduction is achieved by discarding enough intervening hologram strips that any two strips having the maximum angular separation can be moved close enough together that they are only separated by the interocular distance, the information contained in the second hologram can be as little as 6 cm./$S$ times the information contained in the first hologram.

As will be obvious to those skilled in the art, there are numerous modifications to my invention. For example, though it may be somewhat less convenient, the Fourier transform can be made with a lens. To do this, the object to be recorded is located in the front focal plane of the lens and the recording medium in the rear focal plane of the lens. The hologram is formed by interfering a reference beam with the transform formed by the lens. For reconstruction, the hologram is positioned so that it is situated in one focal plane of a second lens. The hologram is then illuminated and the image is seen in the other focal plane of the second lens.

As has been indicated above, discarding every other vertical strip in forming the hyperstereoscopic hologram and making one copy of every vertical strip in forming the hypostereoscopic hologram are only illustrative examples of the amount of discarding or duplicating that is practiced in forming such holograms. Depending on the degree of hyperstereoscopic effect desired and the amount of transition from one view to another that can be tolerated, only one out of every three, or four, or more, vertical strips in the first hologram may be discarded before moving the remaining strips together, or as many as two out of every three strips, three out of every four, or even higher ratios. Similarly, the number of copies of each vertical strip that are made in forming the hypostereoscopic hologram can be varied to alter the hypostereoscopic effect in the reconstructed image. If little effect is desired, a single copy can be made of only every other vertical strip, or every third strip, or fourth, or more. Conversely, if substantial effect is desired, two, three, or more, copies can be made of each strip; and all these copies can be interleaved so that identical vertical strips are next to one another and the order of the strips is preserved. Of course, the change in the average distance between any pair of vertical strips of the first hologram resulting from either discarding or duplicating strips will vary depending on the discarding or duplicating ratio.

There are also many different ways to divide the first hologram into strips and to discard some of these strips or to copy the strips and interleave them to form a second hologram. For example, with a suitable ruling machine the first hologram can be divided into strips of appropriate width, the undesired strips can then be discarded by hand, and the remaining strips can be moved together. Alternatively, the division, discarding and moving can be done by suitable electronic means for scanning the first hologram, for suppressing parts of the signal produced by this scanning, and for shifting together what is left and displaying it so that a second hologram may be formed. Means for scanning, suppressing and displaying are disclosed in the copending application of C. B. Burckhardt entitled "An On-Axis Reference Beam Method for Forming Carrier Frequency Holograms," Ser. No. 712,725, filed Mar. 13, 1968, and assigned to Bell Telephone Laboratories, Incorporated. Means for shifting together the unsuppressed parts of the signal will be obvious to those skilled in the art.

To form duplicates of the strips of the first hologram, multiple copies of the first hologram can be made, for example, by copying the first hologram as many times as desired or by repeating the exposure process detailed in conjunction with FIG. 1 as many times as desired, using a different recording medium for each exposure; and each hologram made can then be divided into strips. These strips can later be interleaved by hand or by suitable electronic means.

Of course, it is also possible to practice my invention by dividing the hologram into patterns other than that of vertical strips. Although vertical strips are ordinarily used to achieve hyperstereoscopic and hypostereoscopic effects because the eyes of the viewer are ordinarily on a horizontal axis, there may be instances where horizontal strips or other configurations are more desirable. Thus, where information reduction is the primary goal, it may be preferable to divide the hologram into tiny squares and discard, for example, all the squares in every other column and row of the resultant lattice.

Figure 5:
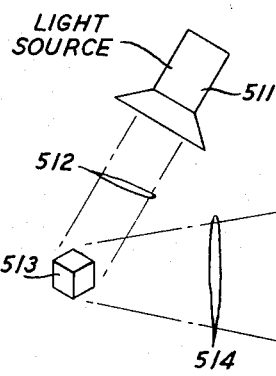
FIG. 5 is a schematic illustration of typical prior art apparatus used to form an integral photograph as the first step in other embodiments of my invention.

As an alternative to forming a Fourier transform hologram, a Lippmann integral photograph may be formed with the apparatus of FIG. 5. The properties of the Lippmann photograph are more extensively described in H. E. Ives' article, "Optical Properties of a Lippmann Lenticulated Sheet," Journal of the Optical Society of America, 21, 171 (March 1931); and these properties are utilized to form a photograph that can be illuminated to produce a three-dimensional image that is either hyperstereoscopic or hypostereoscopic.

The apparatus depicted in FIG. 5 comprises a light source 511 from which is projected an illuminating beam 512, a three-dimensional object 513, a large field lens 515, a rectilinear array of equally spaced, uniform, spherical lenslets each a few millimeters in diameter referred to as fly's eye lens 516, and a recording medium 517. Object 513 is located in the front focal plane of lens 515 and medium 517 in the image plane of lens 516. Unlike the light sources in FIG. 1, light source 511 need not be coherent because a three-dimensional image can be reconstructed from an integral photograph even if the light source is incoherent.

To form the integral photograph, illuminating beam 512 is directed from source 511 onto object 513 where it is modulated to form an information-bearing beam 514 that is reflected to lens 515. Lens 515 forms an approximation to the Fourier transform, the only difference between the Fourier transform and what is formed being a phase factor, a difference that does not matter because it is not possible to record both the phase and the amplitude of an incoherent beam of light.

As has been described above, the effect of so forming the Fourier transform with the field lens is to render parallel the light diverging from a point in the front focal plane of the lens. Because there are many such points from which light diverges, there are many different parallel beams formed by field lens 515. Substantially all of these parallel beams are incident on most of the tiny lenslets of fly's eye lens 516. Each lenslet then form the inverse Fourier transform of the parallel beams that are incident on it. Of course, the parallel beams incident on each lenslet are part of the Fourier transform of the beam of light formed by illuminating the original object; and it can be shown that the inverse Fourier transform of each part of the Fourier transform is part of the original beam of light. Hence, each lenslet forms on recording medium 517 a tiny image of the original object. Typically, each image is only a few millimeters in diameter, the same size as the size of each lenslet. Moreover, as is apparent from elementary geometrical ray tracing, each such image is centered behind a lenslet fly's eye lens 516. Hence, the images are formed in an equally spaced rectilinear array.

To form an integral photograph from which can be reconstructed a hyperstereoscopic image, I then divide the first integral photograph, shown as element 617 in FIG. 6A, into a multitude of vertical strips numbered C1, C2, C3, . . . , Cn–2, Cn–1, Cn. Typically, each strip is just as wide as one of the tiny images of object 513. I then discard a certain percentage of these strips and move the remaining strips together to form a second integral photograph. Illustratively, I discard every other strip, namely strips C2, C4, C6, . . . , and move the remaining strips together to form a second integral photograph shown as element 617' of FIG. 6B, that is comprised of strips C1, C3, C5, . . . .

The hyperstereoscopic image is then viewed with typical illumination apparatus shown in FIG. 7. This apparatus comprises a light source 711 from which is projected an illuminating beam 712, integral photograph 617', a fly's eye lens 716 and a large field lens 715. Photograph 617' is positioned so that it is in the front focal plane of lens 716 and each of the images that are recorded on photograph 617' is aligned with one of the lenslets of lens 716. Fly's eye lens 716 should be similar enough to fly's eye lens 516 of FIG. 5 that each of the images recorded on photograph 617' can be, and is, aligned with a lenslet that is optically equivalent to the lenslet with which the equivalent portion of recording medium 517 was aligned during the recording process detailed in FIG. 5.

To view photograph 617', light beam 712 from light source 711 is directed through photograph 617' and fly's eye lens 716; and a real pseudoscopic image 713 of object 513 is observed in the front focal plane of field lens 715. Because of the alterations detailed in conjunction with FIGS. 6A and 6B, image 713 is hyperstereoscopic.

To form an integral photograph from which can be reconstructed a hypostereoscopic image, a first integral photograph is formed as in FIG. 5; and the first photograph, shown as element 817 in FIG. 8A, is divided into a multitude of vertical strips, numbered D, D2, D3, . . . , Dn. Each such strip contains in its horizontal direction an integral number of images of object 513. Each of these strips is then copied a certain number of times; and the sets of strips are then interleaved to form a second integral photograph in which identical vertical strips are next to one another and the same order of strips is preserved. Illustratively, a single copy of each strip is made; and the two sets of strips are interleaved to form a second integral photograph, shown as element 817' of FIG. 8B, comprised of strips D1, D1, D2, D2, . . . , Dn–1, Dn–1, Dn, Dn.

The hypostereoscopic image is then viewed with typical illumination apparatus such as that shown in FIG. 7. In this case, integral photograph 817 is mounted in the front focal plane of the fly's eye lens and each image is aligned with a lenslet in the fly's eye lens. Under such conditions, when a light beam is directed through photograph 817' and the fly's eye lens, a real pseudoscopic image is observed. Because of the processing detailed in conjunction with FIGS. 8A and 8B, this image is hypostereoscopic.

It will be appreciated that those skilled in the art may devise other arrangements that fall within the spirit and scope of my invention.

What is claimed is:

1. A method for forming a hologram of an object and reconstructing therefrom a hyperstereoscopic image of the object comprising the steps of:
    making a first hologram of at least portions of a Fourier transform of the object comprising the steps of:
    forming an interference pattern by interfering two light beams, one of which beams has been modulated by the object and the other of which beams is a reference beam having a constant phase relation with the modulated beam; and
    recording on a first recording medium at least portions of the interference pattern to form the first halogram, said hologram extending in first and second dimensions on the recording medium a first distance in the first dimension and a second distance in the second dimension;
    making a second hologram comprised of at least some of the portions of the Fourier transform recorded in the first hologram, said second hologram likewise extending in first and second dimensions a third distance in the first dimension and a fourth distance in the second dimension with at least one of said third and fourth distances on the second hologram being less than the corresponding first and second distances on the first hologram, whereby the distances between at least some pairs of the portions of the Fourier transform that comprise the second hologram are less than the distances between the same pairs of these portions in the first hologram; and
    illuminating the second hologram with a reconstructing beam similar in direction and shape to the reference beam to reconstruct the image of the object stored therein.

2. The method of claim 1 wherein:
    making the first hologram of at least portions of the Fourier transform of the object comprises the steps of:
        recording the Fourier transform hologram on the first recording medium;
        dividing the hologram into several portions, each having a definite order with respect to every other portion and a definite distance from every other portion; and
        discarding some of the portions; and
    making the second hologram comprises the step of relocating the undiscarded portions while preserving their order by moving them together so that any voids created by discarding the other portions are filled in.

3. The method of claim 2 wherein:
    the first Fourier transform hologram is divided into vertical strips;
    at least every other strip is discarded; and
    the undiscarded strips are moved together so that the average distance between any pair of strips in the second hologram is at least fifty percent less than the distance between the same pair of strips in the first hologram.

4. A method for forming a hologram of an object and reconstructing therefrom a hypostereoscopic image of the object comprising the steps of:

making a first hologram of at least portions of a Fourier transform of the object comprising the steps of:

forming an interference pattern by interfering two light beams, one of which beams has been modulated by the object and the other of which beams is a reference beam having a constant phase relation with the modulated beam; and recording on a first recording medium at least portions of the interference pattern to form the first hologram, said hologram extending in first and second dimensions on the recording medium a first distance in the first dimension and a second distance in the second dimension;

making a second hologram comprised of at least some of the portions of the Fourier transform recorded in the first hologram and duplicates thereof, said second hologram likewise extending in first and second dimensions a third distance in the first dimension and a fourth distance in the second dimension with at least one of said third and fourth distances on the second hologram being greater than the corresponding first and second distances on the first hologram, whereby the distances between at least some pairs of the portions of the Fourier transform that comprise the second hologram are greater than the distances between the same pairs of these portions in the first hologram; and illuminating the second hologram with a reconstructing beam similar in direction and shape to the reference beam to reconstruct the image of the hypostereoscopic image stored therein.

5. The method of claim 4 wherein:

making the first hologram of at least portions of the Fourier transform of the object comprises the steps of:

recording the Fourier transform hologram on the first recording medium;

dividing the hologram into several portions, each having a definite order with respect to every other portion and a definite distance from every other portion; and making the second hologram comprising the steps of:

duplicating at least some of the portions of the Fourier transform; and arranging the identical discrete portions adjacent one another while preserving the order between different portions.

6. The method of claim 4 wherein:

the first Fourier transform hologram is divided into vertical strips;

each strip is duplicated at least once; and the strips are interleaved so that identical discrete portions are next to one another, thereby at least doubling the average distance between any pair of different strips.

7. A method for forming an integral photograph of an object and reconstructing therefrom a hyperstereoscopic image of the object comprising the steps of:

illuminating the object to form an information-bearing beam that is directed through a first lens that is located with the object in its front focal plane, whereby a beam is formed that is an approximation to the Fourier transform of the information-bearing beam;

forming with a second lens a first integral photograph of at least portions of the beam that is an approximation to the Fourier transform, said integral photograph extending in first and second dimensions a first distance in the first dimension and a second distance in the second dimension;

making a second integral photograph of at least some portions of the information-bearing beam recorded in the first integral photograph, said second integral photograph likewise extending in first and second dimensions a third distance in the first dimension and a fourth distance in the second dimension with at least one of said third and fourth distances on the second integral photograph being less than the corresponding first and second distances on the first integral photograph, whereby the distances between at least some pairs of the portions of the information-bearing beam that comprise the second integral photograph are less than the distances between the same pairs of these portions in the first integral photograph; and directing an illuminating beam through the second integral photograph, the second lens and the first lens to reconstruct the hyperstereoscopic image of the object stored in the second integral photograph.

8. A method for forming an integral photograph of an object and reconstructing therefrom a hypostereoscopic image of the object comprising the steps of:

illuminating the object to form an information-bearing beam that is directed through a first lens that is located with the object in its front focal plane, whereby a beam is formed that is an approximation to the Fourier transform of the information-bearing beam;

forming with a second lens a first integral photograph of at least portions of the beam that is an approximation to the Fourier transform, said integral photograph extending in first and second dimensions a first distance in the first dimension and a second distance in the second dimension;

making a second integral photograph comprised of at least some portions of the information-bearing beam recorded in the first integral photograph and duplicates of these portions, said second integral photograph likewise extending in first and second dimensions a third distance in the first dimension and a fourth distance in the second dimension with at least one of said third and fourth distance on the second integral photograph being greater than the corresponding first and second distances on the first integral photograph, whereby the distances between at least some pairs of the portions of the information-bearing beam that comprise the second integral photograph are greater than the distances between the same pairs of these portions in the first integral photograph; and directing an illuminating beam through the second integral photograph, the second lens and the first lens to reconstruct the hypostereoscopic image of the object stored in the second integral photograph.

References Cited

De Bitetto, Applied Physics Letters, vol. 12, No. 5, Mar. 1, 1968, pp. 176–8.

Viols, IBM Tech. Disclosure Bull., vol. 8, No. 11, April 1966, pp. 1581–3.

DAVID SCHONBERG, Primary Examiner

R. J. STERN, Assistant Examiner

U.S. Cl. X.R.

350—131, 167